United States Patent
Katayama et al.

(10) Patent No.: US 7,048,501 B2
(45) Date of Patent: May 23, 2006

(54) DUST COLLECTING FILTER, DUST COLLECTING DEVICE, AND AIR INTAKE DEVICE FOR GAS TURBINE

(75) Inventors: Hiroyuki Katayama, Hyogo-ken (JP); Yoshiyuki Doi, Hyogo-ken (JP); Toyosei Aota, Hyogo-ken (JP); Tatsuo Adachi, Saitama-ken (JP); Satoshi Hara, Saitama-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/416,495

(22) PCT Filed: Nov. 21, 2001

(86) PCT No.: PCT/JP01/10157

§ 371 (c)(1),
(2), (4) Date: Feb. 19, 2004

(87) PCT Pub. No.: WO03/043717

PCT Pub. Date: May 30, 2003

(65) Prior Publication Data

US 2004/0141835 A1 Jul. 22, 2004

(51) Int. Cl.
*F01D 25/00* (2006.01)
(52) U.S. Cl. .......... 415/121.2; 55/487; 55/521
(58) Field of Classification Search ......... 415/121.2; 55/486–487, 385.3, 498, 521; 95/268, 273
See application file for complete search history.

(56) References Cited

U.S. PATENT DOCUMENTS

| 5,098,767 | A | * | 3/1992 | Linnersten ............... 95/273 |
| 5,672,399 | A | | 9/1997 | Kahlbaugh et al. |
| 6,123,751 | A | * | 9/2000 | Nelson et al. ............ 95/268 |
| 6,540,805 | B1 | * | 4/2003 | Ohno et al. .............. 55/486 |
| 6,673,136 | B1 | * | 1/2004 | Gillingham et al. ...... 95/273 |
| 2003/0226792 | A1 | | 12/2003 | Tumbrink et al. |

FOREIGN PATENT DOCUMENTS

| DE | 198 54 565 A1 | 5/2000 |
| JP | 61-187915 | 8/1986 |
| JP | 4-180808 | 6/1990 |
| JP | 56610/1991 | 5/1991 |
| JP | 8-243321 | 9/1996 |
| JP | 11-197423 | 7/1999 |

* cited by examiner

Primary Examiner—Ninh H. Nguyen
(74) Attorney, Agent, or Firm—Oblon, Spivak, McClelland, Maier & Neustadt, P.C.

(57) ABSTRACT

A large capacity HEPA filter is produced having a layered filter medium unitarily formed by an upstream non-woven fabric, which can remove 70 to 90% of 0.3 μm particles, and a downstream non-woven fabric, which can remove 99.9% of 0.3 μm particles or more. The layered filter medium is shaped as a mini pleat shape in a thickness direction and an entire shape in the thickness direction is a plurality of continuous Vs. Also, a dust collecting device having such a large capacity HEPA filter is produced and an air intake device for a gas turbine is provided with such a dust collecting device.

21 Claims, 9 Drawing Sheets

DUST COLLECTING FILTER, DUST COLLECTING DEVICE, AND AIR INTAKE DEVICE FOR GAS TURBINE

TECHNICAL FIELD

The present invention relates to, for example, an air intake device for supplying an absorbed air to an air compressing device in a gas turbine, a dust collecting device which is provided to the air intake device for removing lithometeors which are contained in the absorbed air, and a dust collecting filter which is provided in the dust collecting device.

BACKGROUND ART

A gas turbine absorbs an atmosphere. Under a normal condition, an atmosphere contains lithometeors having particle diameter of 1 µm to 10 µm Disclosure of Invention. When such a lithometeor is absorbed in a gas turbine and adheres on a rotor blade in an air compressing device, a fluid resistance increases; thus, an output loss increases. As a result, there is a problem in that an electricity generation output decreases. In order to prevent such a problem, as shown in FIG. 10, a dust collecting device 1 (filter unit) is disposed in the air intake device in the gas turbine so as to remove the lithometeors for cleaning the absorbed air in the air compressing device.

Figure 10:
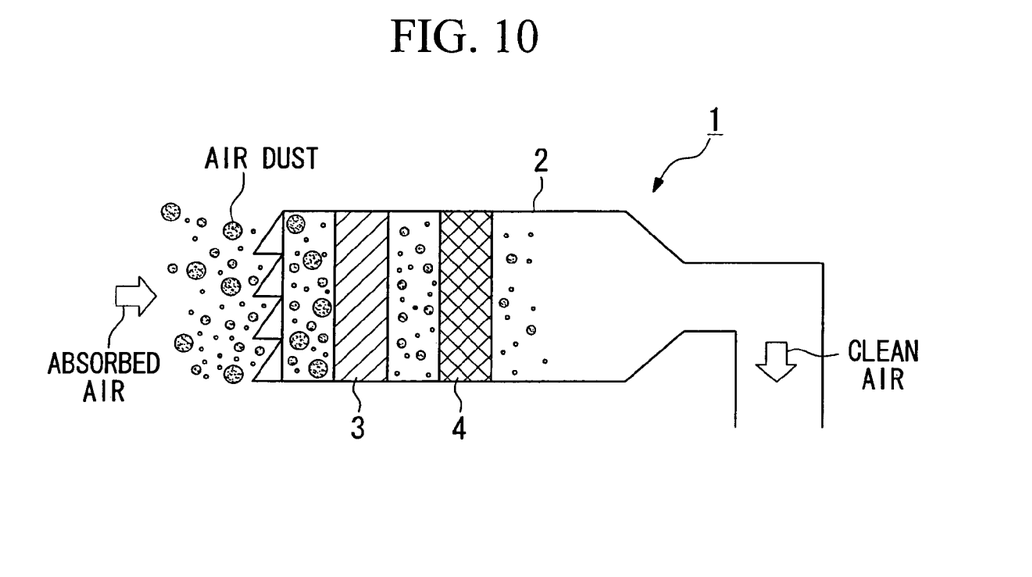
FIG. 10 is a cross section showing a conventional dust collecting device having two-stage structure.

A dust collecting device 1 shown in FIG. 10 having two stages comprises a housing 2 which is connected to the air compressing device (not shown in the drawing), a coarse filter 3 (pre-filter) which is disposed in uppermost stream in the housing 2, and a middle-efficiency filter 4 for removing mainly lithometeors having a particle diameter which is finer than the coarse filter 3.

By the above dust collecting device 1, approximately 30% of lithometeors having approximately 1 µm of particle diameter in the absorbed air which absorbed in the housing 2 are removed by passing through the coarse filter 3. Furthermore, approximately 70% of lithometeors having approximately 1 µm of particle diameter in the absorbed air are removed by passing through the middle-efficiency filter 4.

Figure 11:
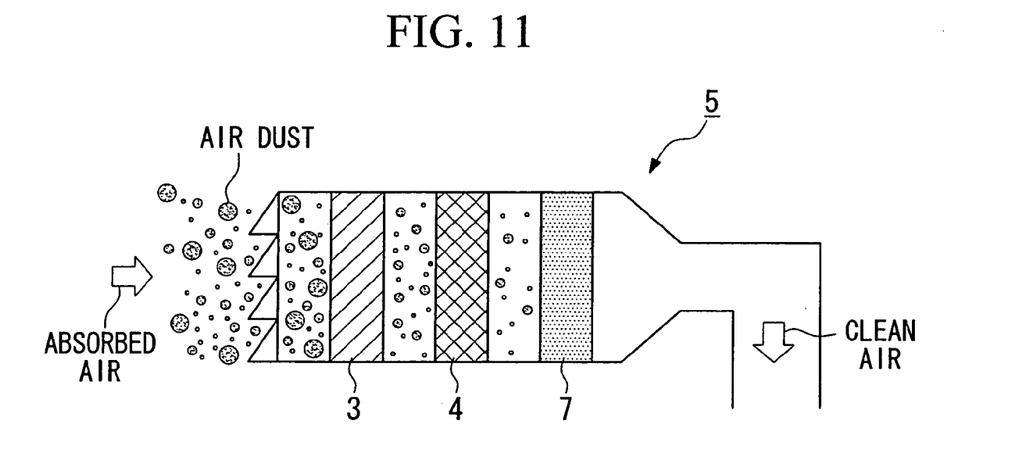
FIG. 11 is a cross section showing a conventional dust collecting device having three-stage structure.

As explained above, from an energy generating efficiency point of view, in a gas turbine, it is preferable that lithometeors in an atmosphere which are absorbed should be minimized. Therefore, more efficiency in collecting and removing the dusts is required. In such a case, a dust collecting device 5 having three stage structure is used as shown in FIG. 11.

In addition to the coarse filter 3 and the middle efficiency filter 4 which form the dust collecting device 1, the dust collecting device 5 further comprises a high efficiency filter 7 (High Efficiency Particulate Air Filter, hereinafter called as a HEPA filter) in a downstream. The HEPA filter 7 can remove 99.97% or more of lithometeors having approximately 0.3 µm of particle diameter. It is possible to remove approximately all of lithometeors contained in an atmosphere by these filters 3, 4, and 7.

As explained above, although the dust collecting device 5 having three stage structure can achieve high dust collecting efficiency, a size of the dust collecting device becomes larger so as to dispose the HEPA filter therein. If the device becomes larger, a space for installation needs to be larger; thus, the installation of the device often becomes difficult. According to such a condition, it has been requested that the size of the device be decreased.

Figure 12:
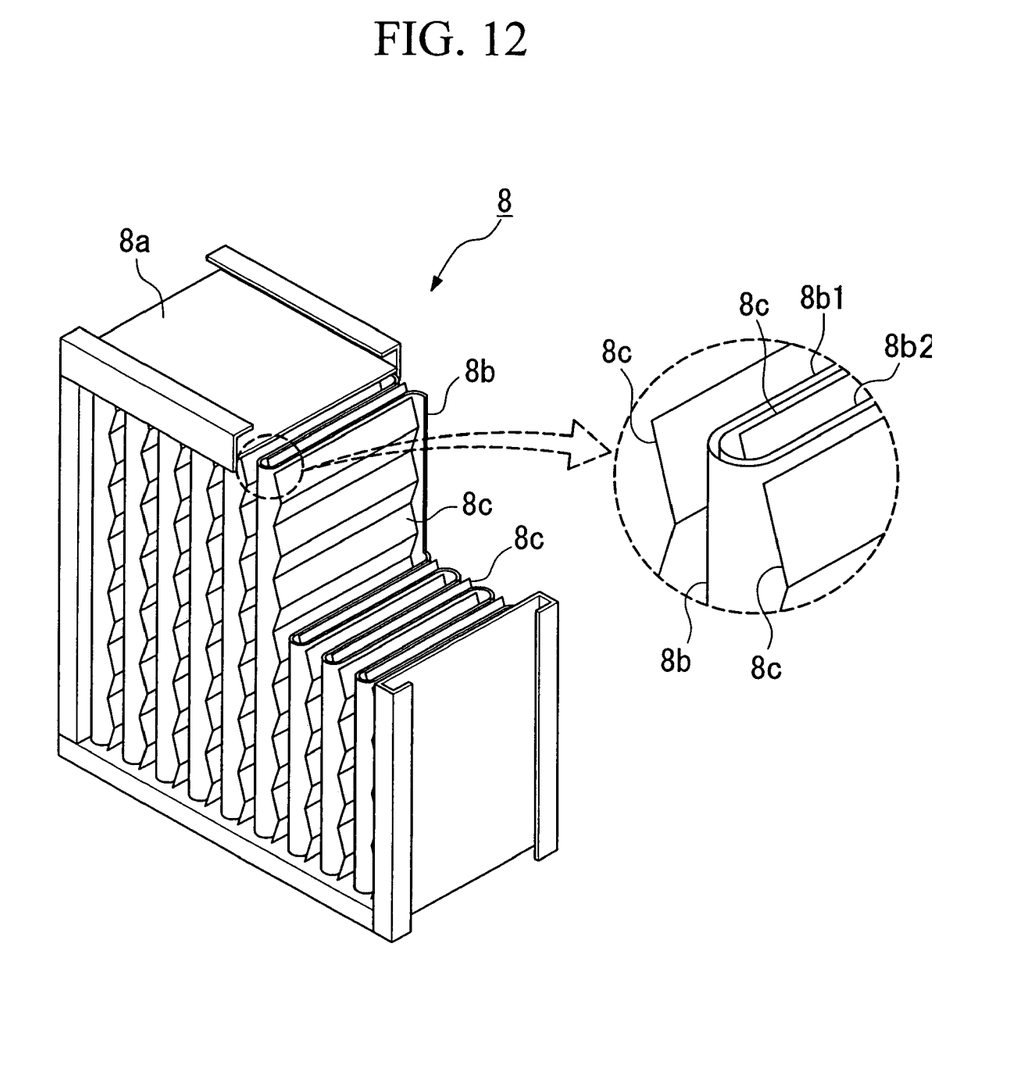
FIG. 12 is a perspective view showing a conventional layered dust collecting filter.

For such an object for making a small device, there has been developed a layered filter device having a middle efficiency filter and a HEPA filter unitarily. An example for a conventional layered filter device is shown in FIG. 12. A layered filter device 8 shown in FIG. 12 comprises a frame 8a having a rectangular shape, a layered filter 8b which is folded to be contained in the frame 8a, and a partition 8c which separates wall sections which neighbor each other in the layered filter 8b. A layered filter 8b is formed by simply layering and folding the middle efficiency filter 8b1 and the HEPA filter 8b2. The middle efficiency filter 8b1 and the HEPA filter 8b2 are disposed so as to be separated each other.

In such a conventional layered filter device 8, size of the device becomes smaller by forming the middle efficiency filter 8b1 and the HEPA filter 8b2 unitarily. However, from a dust collecting efficiency point of view, there is a case in which a required performance cannot be realized necessarily only by folding the layered filter 8b so as to increase a filtering area. That is, dust-collecting capacity is small in such a folded layered filter; thus, a product life in such a filter becomes short; therefore, it is necessary to exchange the filters in a short period.

Generally, in a gas turbine, it is preferable that it is possible to operate a gas turbine continuously for one year (8,760 hours of operational time) without exchanging the filter. However, a product life in the above conventional layered filter device 8 has been so short that the device could be operated only for half a year.

In order to realize a longer product life in a filter in the above layered filter device 8, one idea is to increase the filtering area by forming fine gaps on the layered filter device 8. However, as explained above, the layered filter 8b is formed by attaching and folding the middle-efficiency filter 8b1 and the HEPA filter 8b2 simply such that the middle-efficiency filter 8b1 and the HEPA filter 8b2 are disposed so as to be separated each other. Therefore, it has not been possible to form fine gaps while maintaining the condition under which the middle-efficiency filter 8b1 and the HEPA filter 8b2 should not be removed from each other.

The present invention was made in consideration of the above problems. An object of the present invention is to provide a dust collecting filter, a dust collecting device, and an air intake device for a gas turbine which are provided with a layered filter medium which can increase the filtering area so as to maintain a high dust-collecting efficiency for a longer hour under a small size condition.

DISCLOSURE OF THE INVENTION

A dust collecting filter according to the present invention may have a layered filter medium unitarily formed by an upstream non-woven fabric which can remove 70 to 90% of 0.3 µm particle and a downstream non-woven fabric which can remove 99.9% of 0.3 µm particle or more. It may be preferable that a shape of a layered filter medium is a minipleat shape in a thickness direction and an entire shape in the thickness direction is a plurality of continuous V shape (hereinafter Vs).

According to such a dust collecting filter, the upstream non-woven fabric and the downstream non-woven fabric are formed to be a piece of layered filter medium unitarily not only by attaching them simply but also by forming it seamlessly. Therefore, it is possible to form the layered filter medium into a minipleat shape easily. Also, by using such a layered filter medium having a minipleat shape, it is possible to realize a larger filtering area than in a conventional case of a flat layer; therefore, it is possible to maintain a high dust-collecting efficiency for a longer hour under condition of a small size device.

In a dust collecting filter according to the present invention, it may be preferable that the layered filter medium is contained in a filter frame having 600±20 mm in height, 600±20 mm in width, and 300±20 mm in length in size, and 5 to 7 Vs are formed.

In such a dust collecting filter, 5 to 7 V-shapes are formed in a small filter frame. Therefore, it is possible to realize a filtering area as large as 30 m² to 60 m². If there are 4 V-shapes or less under such a condition, it is not possible to realize a filtering area as large as 30 m² to 60 m². If there are 8 V-shapes or more under such a condition so as to increase the filtering area for reducing a filtering resistance, a pitch dimension in a space between the filter media which form the V-shape becomes narrow. Therefore, a resistance in a flow path increases; thus, an air flow hardly flows. From this point of view, it is preferable that there are 5 to 7 V-shapes.

Also, according to the present invention, it may be preferable that the upstream non-woven fabric is a filter medium having 0.1 mm to 0.3 mm thickness formed by a fiber having 0.3 μm to 15 μm of fiber diameter, and he downstream non-woven fabric is a filter medium having 0.1 mm to 0.3 mm thickness formed by a fiber having 0.1 μm to 2 μm of fiber diameter.

According to such a dust collecting filter, the upstream non-woven fabric can remove 70 to 90% of particles having 0.3 μm of diameter, and the downstream non-woven fabric can remove 99.9% or more of particles having 0.3 μm of diameter reliably.

Also, in a dust collecting filter according to the present invention, it may be preferable that a width of the minipleat shape is 10 mm to 30 mm a pitch dimension of the minipleat shape is 1.7 mm to 3.2 mm.

By such a dust collecting filter, it is possible to realize an optimum dust-collecting efficiency according to a filtering area. That is, it is necessary to increase a width dimension of the minipleat shape and decrease the pitch dimension so as to enlarge the filtering area in the layered filter medium. However, if such an arrangement excesses, an air flow does not become uniform in an entire filter medium due to an increase of a flow resistance because of factors such as a contact of the neighboring V-shape wall sections of the filter medium and a shape thereof; thus, it is not possible to realize an optimum dust-collecting efficiency according to the filtering area. Therefore, by adopting a minipleat shape having a shape and dimension as described in the present invention, it is possible to realize a high dust-collecting efficiency according to the filtering area.

Also, in a dust collecting filter according to the present invention, it may be preferable that the upstream non-woven fabric and the downstream non-woven fabric are non-woven fabric formed by mixing a polyester fiber and a glass fiber.

By such a dust collecting filter, it is possible that polyester fibers having relatively a large fiber diameter are entangled more closely; thus, it is possible to remove a dust and particle having middle to large particle diameter effectively. Also, it is possible that glass fibers having a fiber diameter smaller than that of the polyester fiber is disposed in preferable balance in an organization of the polyester fibers which entangle closely; thus, it is possible to remove particles having smaller particle diameter effectively. By doing this, it is possible to remove both particles having a small particle diameter and particles having a large particle diameter effectively.

Also, in a dust collecting filter according to the present invention, it may be preferable that a flow rectifying section for introducing an air flow which reaches in an upstream angular section toward a space which is formed between wall sections neighboring each other and having V-shape is formed in the upstream angular section having V-shape formed by the layered filter medium.

By such a dust collecting filter, it is possible that an air flow is introduced smoothly into an upstream angular section where an air flow easily separates; thus, it is possible to reduce a compression loss in an air intake mouth for a filter. That is, if V-shapes increases so as to enlarge the filtering area, an area for passing an air flow decreases in an air intake mouth in a filter. Occasionally, an air flow separates in the upstream angular section; thus, a contraction air flow is formed which causes an increased compression loss. For such a case, a flow rectifying section is disposed in an upstream angular section where an air flow separates particularly easily so as to introduce an air flow smoothly; thus, it is possible to reduce a compression loss in an air intake mouth in the filter.

In a dust collecting filter according to the present invention, it may be preferable that a separating member for separating an air flow under condition of after passing a space between the wall sections neighboring each other and having V-shape is disposed in a downstream space having V-shape formed by the layered filter medium.

Usually, a compression loss increases under condition that there are no separating members for separating an air flow because air flows intermediate each other after passing a space between the neighboring wall sections in the layered filter medium. Therefore, it is possible to prevent such an intermediation by disposing a separating members so as to separate a space between the neighboring wall sections. Thus, it is possible to reduce the increase of the compression loss which is caused during passing the dust collecting filter.

In a dust collecting filter according to the present invention, it may be preferable that a dust collecting filter has a layered filter medium formed by a first non-woven fabric having relatively low particle removing efficiency and a second non-woven fabric having relatively high particle removing efficiency unitarily.

According to such a dust collecting filter, the upstream non-woven fabric and the downstream non-woven fabric are formed to be a piece of layered filter medium unitarily not only by attaching them simply but also by forming it seamlessly. Therefore, it is possible to form the layered filter medium into a minipleat shape easily. Also, by using such a layered filter medium into a preferable shape such as a minipleat shape, it is possible to realize a larger filtering area than in a conventional case of a flat layer. Accordingly, a dust collecting filter according to the present invention is provided with a layered filter medium which can enlarge the filtering area in a limited space; thus, it is possible to maintain a high dust-collecting efficiency for a longer hour under condition of a small size device.

Also, in a dust collecting filter according to the present invention, it may be preferable that the first non-woven fabric is formed by mixing a first fiber having relatively larger fiber diameter and a second fiber having relatively smaller fiber diameter, the second non-woven fabric is formed by mixing a third fiber having relatively larger fiber diameter and a fourth fiber having relatively smaller fiber diameter. Also, a first fiber ratio is smaller than a second fiber ratio under condition that the first fiber ratio is defined as a quotient of the diameter of the second fiber divided by the diameter of the first fiber and the second fiber ratio is defined as a quotient of the diameter of the fourth fiber divided by the diameter of the third fiber.

By such a dust collecting filter, it is possible to remove both particles having a small particle diameter and particles having a large particle diameter effectively.

Also, in a dust collecting filter according to the present invention, it may be preferable that the first fiber and the third fiber are polyester fibers and the second fiber and the fourth fiber are glass fibers.

By such a dust collecting filter, it is possible that polyester fibers having relatively a large fiber diameter are entangled more closely; thus, it is possible to remove a dust and particle having middle to large particle diameter effectively. Also, it is possible that glass fibers having a fiber diameter smaller than that of the polyester fiber is disposed in preferable balance in an organization of the polyester fibers which entangle closely; thus, it is possible to remove particles having smaller particle diameter effectively. By doing this, it is possible to remove both particles having a small particle diameter and particles having a large particle diameter effectively.

Also, in a dust collecting filter according to the present invention, it may be preferable that the first non-woven fabric is formed by fibers having 0.3 to 15 μm of fiber diameter, and the second non-woven fabric is formed by fibers having 0.1 to 2 μm.

According to such a dust collecting filter, the first non-woven fabric can remove 70 to 90% of particles having 0.3 μm of diameter, and the second non-woven fabric can remove 99.9% or more of particles having 0.3 μm of diameter reliably.

Also, in a dust collecting filter according to the present invention, it may be preferable that the first non-woven fabric can remove 70 to 90% of 0.3 μm particle, and the second non-woven fabric can remove 99.9% of 0.3 μm particle or more.

By such a dust collecting filter, it is possible to remove both particles having a small particle diameter and particles having a large particle diameter effectively.

Also, according to the present invention, it may be preferable that a dust collecting filter has two-layer structure of the first non-woven fabric and the second non-woven fabric.

Usually, there is a concern in tha a filtering resistance increases greatly when a multi-layer such as three or more layers are formed so as to enhance a dust collecting efficiency: Therefore, according to the dust collecting filter according to the present invention, two-layer structure is preferable.

Also, in a dust collecting filter according to the present invention, it may be preferable that the thickness of the first non-woven fabric and the thickness of the second non-woven fabric are in a range of 0.1 mm and 0.3 mm.

By such a dust collecting filter, it is possible to realize a rigidity in the filter for collecting the particles by forming a layer with 0.1 mm thickness. Also, it is possible to restrict the filtering resistance during passing an air flow through the layered filter medium under tolerance by forming a layer with 0.3 mm or thinner thickness.

Also, in a dust collecting filter according to the present invention, it may be preferable that a shape of a layered filter medium is a minipleat shape in a thickness direction. Therefore, it is possible to realize a larger filtering area than in a conventional case of a flat layer; therefore, it is possible to maintain a high dust-collecting efficiency for a longer hour under condition of a small size device.

Also, in a dust collecting filter according to the present invention, it may be preferable that a width of the minipleat shape is 10 mm to 30 mm a pitch dimension of the minipleat shape is 1.7 mm to 3.2 mm.

By such a dust collecting filter, it is possible to realize an optimum dust-collecting efficiency according to a filtering area. That is, it is necessary to increase a width dimension of the minipleat shape and decrease the pitch dimension so as to enlarge the filtering area in the layered filter medium. However, if such an arrangement excesses, an air flow does not become uniform in an entire filter medium due to an increase of a flow resistance; thus, it is not possible to realize an optimum dust-collecting efficiency according to the filtering area. Therefore, by adopting a minipleat shape having a shape and dimension as described in the present invention, it is possible to realize a high dust-collecting efficiency according to the filtering area.

Also, in a dust collecting filter according to the present invention, it may be preferable that an entire shape of the layered filter medium in the thickness direction is a plurality of continuous Vs.

According to such a dust collecting filter, it is possible to increase the filtering area greatly in a limited space, thus, it is possible to realize a higher dust-collecting efficiency.

Also, in a dust collecting filter according to the present invention, it may be preferable that a flow rectifying section for introducing an air flow which reaches in an upstream angular section toward a space which is formed between wall sections neighboring each other and having V-shape is formed in the upstream angular section having V-shape formed by the layered filter medium.

By such a dust collecting filter, it is possible that an air flow is introduced smoothly into an upstream angular section where an air flow easily separates; thus, it is possible to reduce a compression loss in an air intake mouth for a filter. That is, if V-shapes increases so as to enlarge the filtering area, an area for passing an air flow decreases in an air intake mouth in a filter. Occasionally, an air flow separates in the upstream angular section; thus, a contraction air flow is formed which causes an increased compression loss. For such a case, a flow rectifying section is disposed in an upstream angular section where an air flow separates particularly easily so as to introduce an air flow smoothly; thus, it is possible to reduce a compression loss in an air intake mouth in the filter.

Also, in a dust collecting filter according to the present invention, it may be preferable that a separating member for separating a air flow under condition of after passing a space between the wall sections neighboring each other and having V-shape is disposed in a downstream space having V-shape formed by the layered filter medium.

Usually, a compression loss increases under condition that there are no separating members for separating an air flow because air flows intermediate each other after passing a space between the neighboring wall sections in the layered filter medium. Therefore, it is possible to prevent such an intermediation by disposing a separating members so as to separate a space between the neighboring wall sections. Thus, it is possible to reduce the increase of the compression loss which is caused during passing the dust collecting filter.

Also, in a dust collecting filter according to the present invention, it may be preferable that the layered filter medium is contained in a filter frame having a dimensional ratio such as height: width: length is 2:2:1.

By such a dust collecting filter, it is possible to realize higher dust collecting efficiency by adopting a filter frame having a dimensional ratio such height:width:length is 2:2:1.

Also, in a dust collecting filter according to the present invention, it may be preferable that 5 to 7 wall sections having V-shape are formed in the layered filter medium.

By such a dust collecting filter, it is possible to realize a low compression loss and a high dust collecting efficiency in a limited volume inside the dust collecting filter. That is, if four or less V-shapes are formed, it is not possible to obtain a sufficient filtering area. If there are 8 V-shapes or more under such a condition so as to increase the filtering area for reducing a filtering resistance, a pitch dimension in a space between the filter media which form the V-shape becomes narrow. Therefore, a resistance in a flow path increases; thus, an air flow hardly flows. From this point of view, it is preferable that there are 5 to 7 V-shapes.

Also, it may be preferable that a dust collecting device is provided with a dust collecting filter according to the present invention.

Such a dust collecting device is provided with a small size dust collecting filter which can maintain high dust collecting efficiency for a long hours. Therefore, it is possible to reduce a size of the dust collecting device and a running cost of the device because a maintenance work is necessary less frequently.

In a dust collecting device according to the present invention, it may be preferable that a dust collecting device is disposed in an air intake mouth of a gas turbine so as to remove lithometeors which are contained in an air which is absorbed from the air intake mouth.

Such a dust collecting device is provided with a small size dust collecting filter which can maintain high dust collecting efficiency for a long hours. Therefore, it is possible to reduce a size of the dust collecting device and a running cost of the device because a maintenance work is necessary less frequently.

In an air intake device according to the present invention for a gas turbine, it may be preferable that a dust collecting device according to the present invention is provided.

In such an air intake device for a gas turbine, the dust collecting device is provided with a small size dust collecting filter which can maintain a high dust collecting efficiency; thus, it is possible to realize a small size device. Therefore, the device can be installed in relatively a small space. Also, the dust collecting filter can maintain a high dust collecting efficiency for a longer hours; therefore, it is possible to operate a gas turbine continuously without replacing the dust collecting filter for a longer hours.

BRIEF DESCRIPTION OF DRAWINGS

FIGS. 2A and 2B show a dust collecting filter in the above embodiment.

In FIG. 5, a horizontal axis indicates a particle retaining capacity. A vertical axis indicates a compression loss.

FIGS. 7A and 7B show a second embodiment of a dust collecting filter which is used in a dust collecting device according to the present invention.

BEST MODE FOR CARRYING OUT THE INVENTION

Here, embodiments for a dust collecting filter, a dust collecting device, and an air intake device according to the present invention are explained as follows with reference to the attached drawings. More importantly, it should be understood that the present invention is not limited to the following embodiments.

Here, explanations for each embodiments are made under condition that a dust collecting filter/dust collecting device according to the present invention is provided to an air intake device for a gas turbine and lithometeors are removed from an air which is absorbed to an air intake mouth in the air intake device so as to clean the air.

Figure 1:
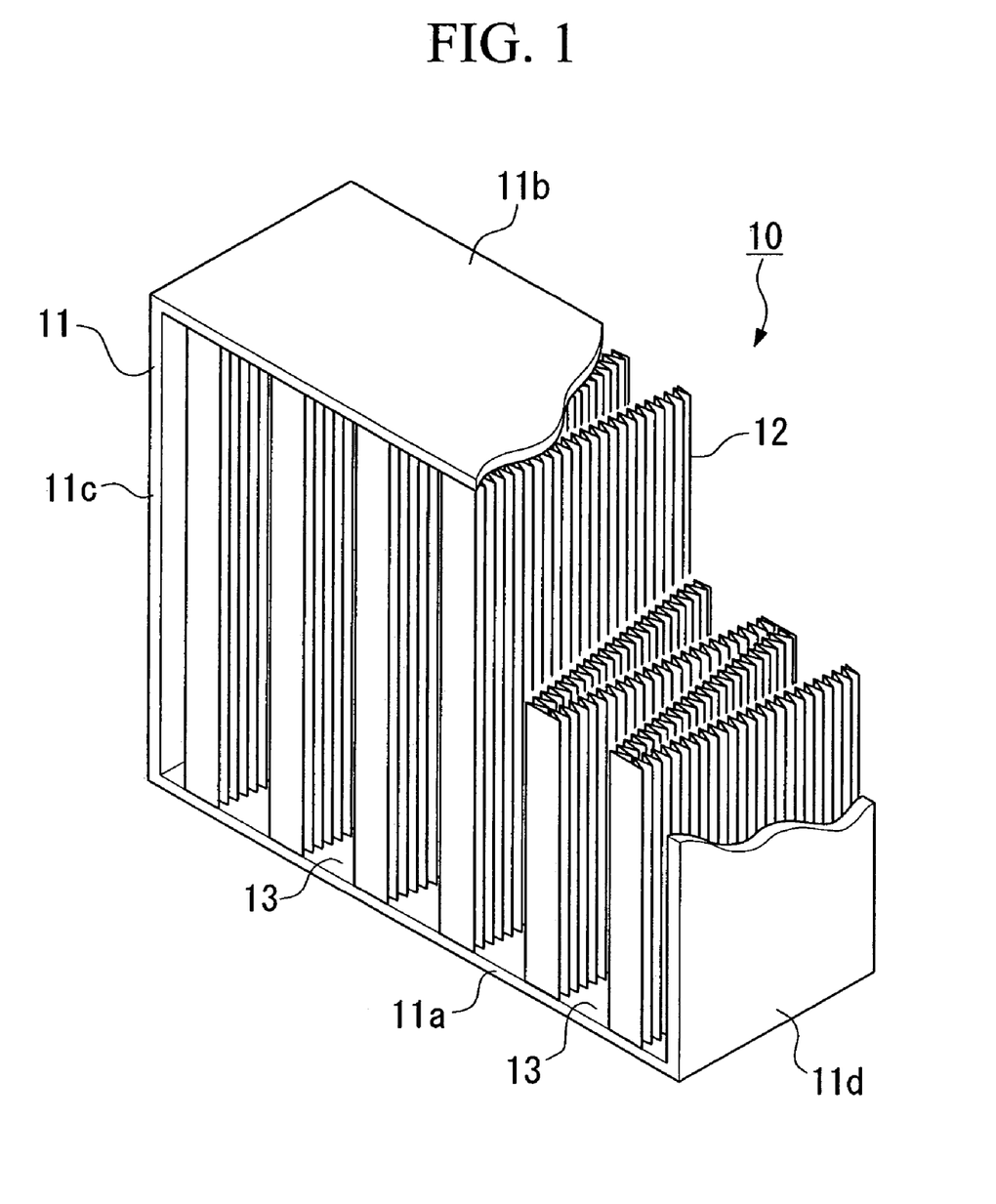
FIG. 1 is a perspective view of a dust collecting filter in a first embodiment which is used in a dust collecting device according to the present invention.
Figure 2A:
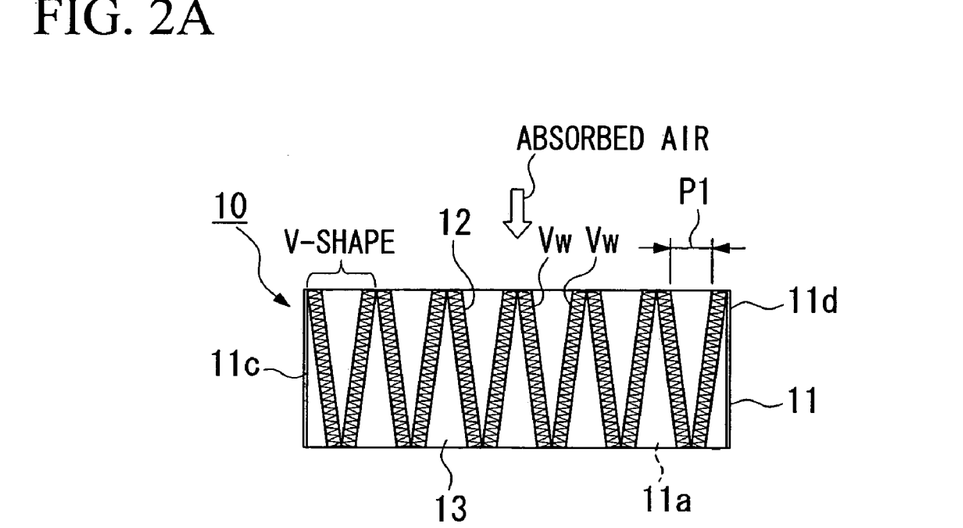
FIG. 2A is a cross section.
Figure 2B:
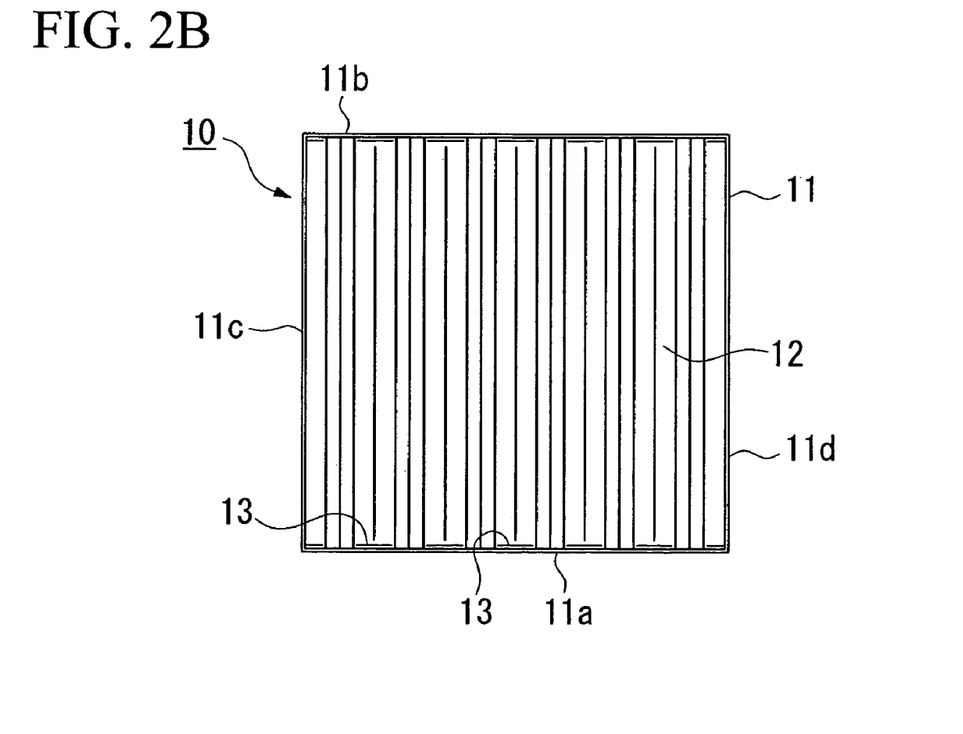
FIG. 2B is a back view observed from a downstream.
Figure 3:
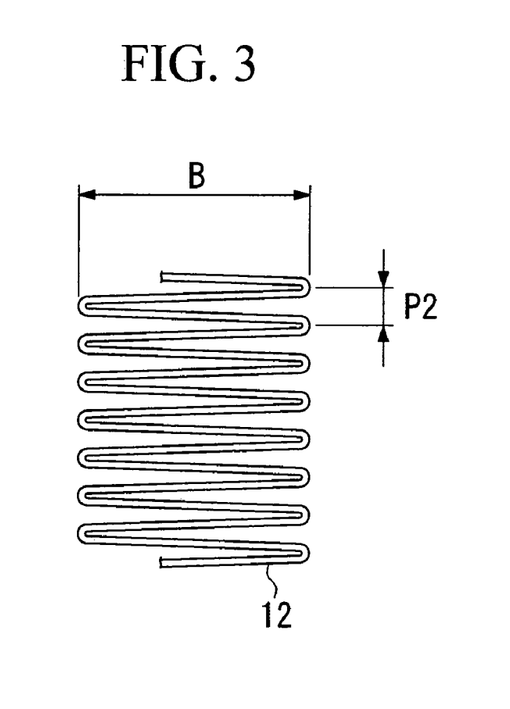
FIG. 3 is a partly enlarged cross section for a minipleat shape in a layered filter medium which is used in a dust collecting filter according to the above embodiment.
Figure 4:
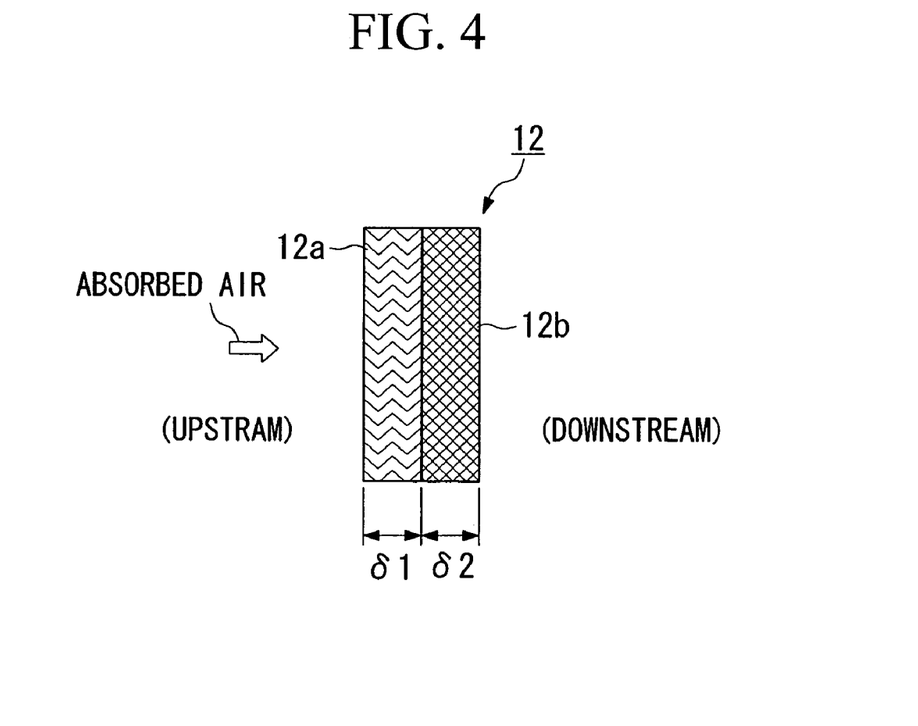
FIG. 4 is a cross section for a part of a layered filter medium which is used in a dust collecting filter according to the above embodiment in a thickness direction.
Figure 5:
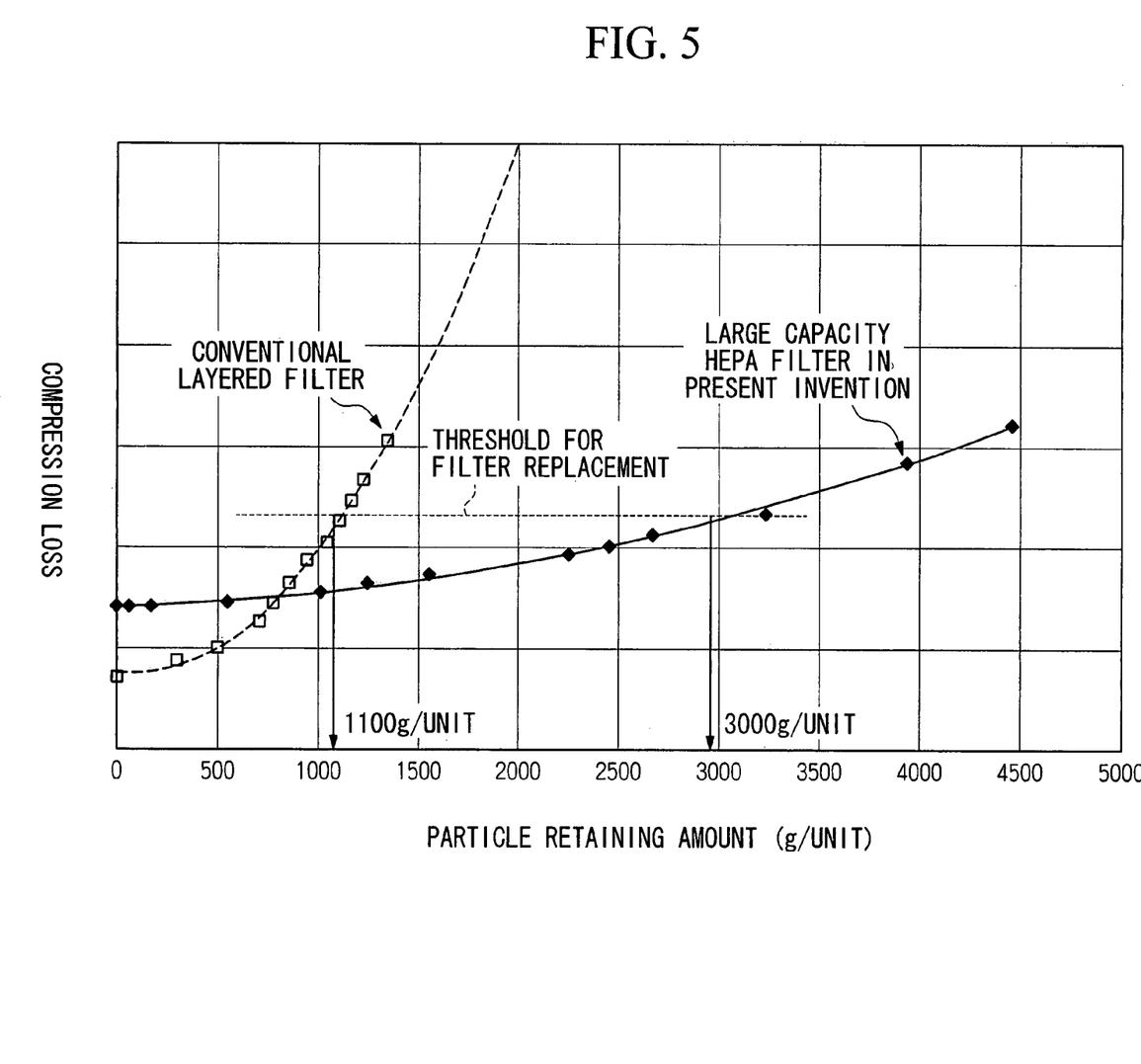
FIG. 5 is a graph showing a filtering performance according to data which are obtained experimentally.
Figure 6:
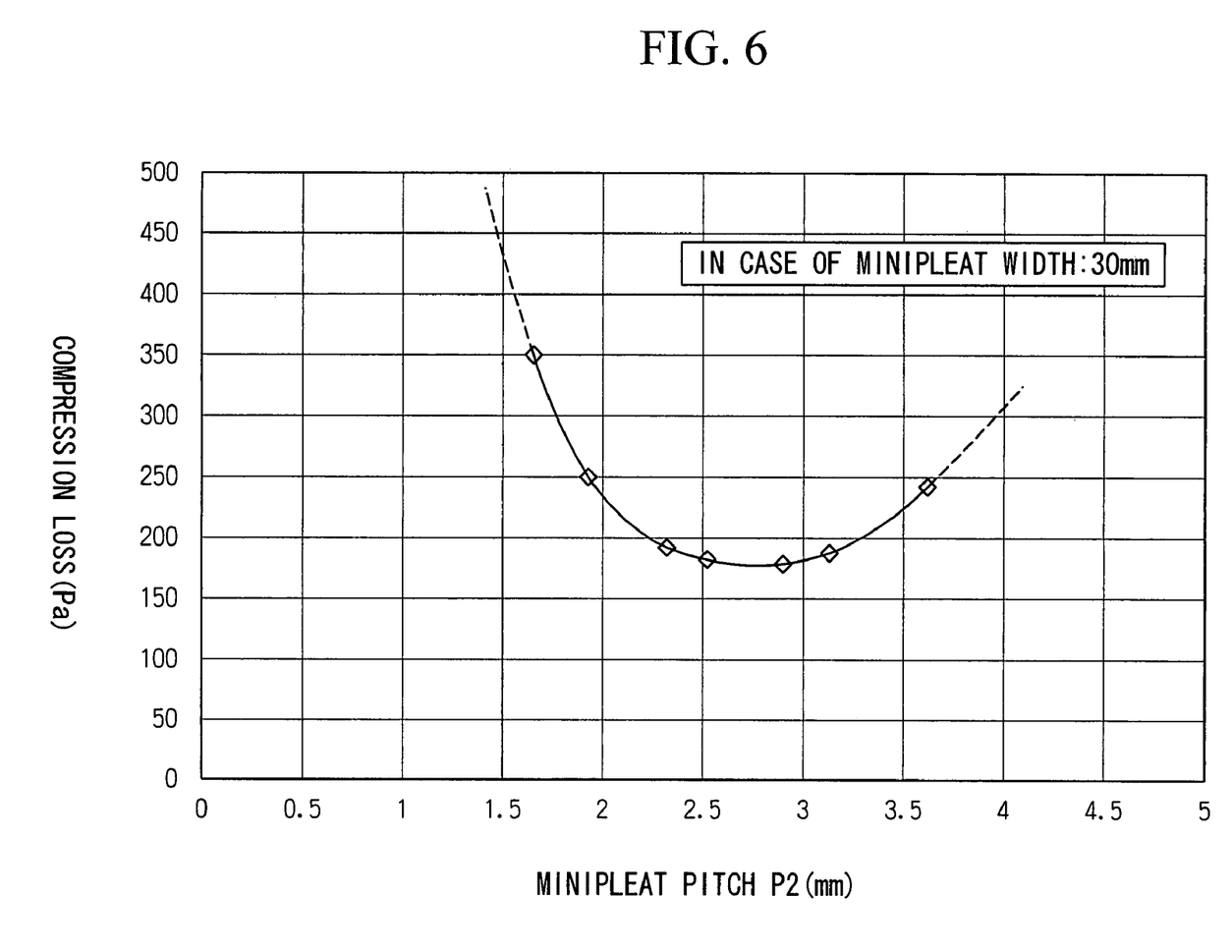
FIG. 6 is a graph showing an optimal pitch dimension which are obtained experimentally for a minipleat shape which is formed by a layered filter medium in a dust collecting filter in the above embodiment. A horizontal axis indicates a pitch dimension in a minipleat shape. A vertical axis indicates a compression loss.

First, a first embodiment according to the present invention is explained with reference to drawings F1 to F6. Here, FIG. 1 is a perspective view for a large capacity HEPA filter which is used in a dust collecting device according to the first embodiment. FIGS. 2A and 2B show a large capacity HEPA filter. FIG. 2A is a cross section. FIG. 2B is a back view observed from a downstream. FIG. 3 is a partly enlarged cross section for a minipleat shape in a layered filter medium which is used in the large capacity HEPA filter. Also, FIG. 4 is a cross section for a part of a layered filter meium which is used in the large capacity HEPA filter in a thickness direction. Also, FIG. 5 is a graph showing a filtering performance in the large capacity HEPA filter according to data which are obtained experimentally. In FIG. 5, a horizontal axis indicates a particle retaining capacity. A vertical axis indicates a compression loss. Also, FIG. 6 is a graph showing an optimal pitch dimension which are obtained experimentally for a minipleat shape which is formed by a layered filter medium in the large capacity HEPA filter. A horizontal axis indicates a pitch dimension in a minipleat shape. A vertical axis indicates a compression loss.

A dust collecting device according to the first embodiment has a two-stage structure in which a housing which is connected to the air compressor, a coarse dust collecging filter (pre-filter) which is disposed in an upstream in the housing, and a large capacity HEPA filter (dust collecting filter) which is disposed in a downstream in the coarse dust collecting filter are provided (not shown in the drawing). According to such a dust collecting device, approximately 30% of lithometeors having 1 μm of particle diameter which is absorbed in the housing are removed by passing through the above coarse dust collecting filter. Furthermore, lithometeors having finer particle diameter is collectively removed by passing through the large capacity HEPA filter.

In the present embodiment, the large capacity HEPA filter is one of the features in the present invention; therefore, explanations are made mainly with regard to this feature.

As shown in FIGS. 1, 2A, and 2B, the large capacity HEPA filter 10 in the present embodiment comprises a filter frame 11, and a layered filter medium 12 which is contained in the filter frame 11, and a sealing member 13.

A filter frame 11 is a rectangular frame formed by a bottom wall 11a, an upper wall 11b, and side walls 11c, 11d. In a filter frame 11, two opening mouths are disposed. One opening mouth is disposed in an upstream toward a coarse dust collecting filter. The other opening mouth is disposed in a downstream. The inner size of the filter frame 11 has 600±20 mm in height, 600±20 mm in width, and 300±20 mm in length in size. That is, a relative dimension ratio for the inner dimension is approximately 2:2:1 under condition of height:width:length. The layered filter medium 12 is contained in the filter frame 11 having such a relative dimension ratio.

As shown in FIGS. 3 and 4, the layered filter medium 12 is unitarily formed by an upstream non-woven fabric 12a (middle efficiency filter; first non-woven fabric) which can remove 70 to 90% of 0.3 μm particle and a downstream non-woven fabric 12b (HEPA filter; second non-woven fabric) which can remove 99.9% of 0.3 μm particle or more. Furthermore, a shape of a layered filter medium is a minipleat shape in a thickness direction. That is, the layered filter medium 12 has a two-layer structure in which the upstream non-woven fabric 12a (first non-woven fabric) in which particle removing efficiency is relatively low and the downstream non-woven fabric 12b (second non-woven fabric) in which particle removing efficiency is relatively high are unitarily formed.

Furthermore, an entire cross sectional shape of the layered filter medium 12 in a thickness direction which is formed in a minipleat shape is formed in continuous 6 to 7 V-shapes (see FIGS. 1 and 2A in which an example of 6 continuous V-shapes are shown). By doing this, it is possible to contain the layered filter medium 12 in the filter frame 11 highly densely.

By forming the upstream non-woven fabric 12a as a middle efficiency filter and the downstream non-woven fabric 12b as a HEPA filter into a piece of filter unitarily, the layered filter medium 12 can be made in a smaller size than a conventional example in which a middle efficiency filter and a HEPA filter (which are equivalent to the middle efficiency filter 4 and the high efficiency filter 7 which are explained in an explanation for a conventional technology) are formed separately.

Here, a method in which the upstream non-woven fabric 12a and the downstream non-woven fabric 12b are not only attached but formed into a piece of fabric is employed. Therefore, it is possible to form a fine minipleat shape easily. Furthermore, it is possible to realize a larger filtering area than a conventional case of a flat layer by disposing such a minipleat shape on the layered filter medium 12.

That is, it is not possible to form a fine minipleat shape so as to realize a larger filtering area by simply attaching the fabrics shown in FIG. 12 as an example of conventional filter medium. In contrast, it is possible to form a minipleat shape on the layered filtering medium 12; thus, it is possible to realize a larger filtering area.

Furthermore, the layered filter medium 12 having a minipleat shape is formed so as to be in 5 to 7 continuous V-shapes and contained in the filter frame 11. Thus, it is possible to realize a filtering area as large as 30 m² to 60 m². If there are 4 V-shapes or less under such a condition, it is not possible to realize a filtering area as large as 30 m² to 60 m². If there are 8 V-shapes or more under such a condition so as to increase the filtering area for reducing a filtering resistance, a pitch dimension P1 between fileter medium wall sections Vw, Vw which form the V-shape becomes narrow (see FIG. 2A). Therefore, a resistance in a flow path increases; thus, an air flow hardly flows. From this point of view, 5 to 7 V-shapes are preferably employed.

By employing such a V-shapes and a minipleat shape, the large capacity HEPA filter 10 according to the present embodiment can realize a higher particle retaining capacity than that of the conventional dust collecting fliber (the layered filter device 8 which is explained with reference to FIG. 12). In FIG. 5, such a high particle retaining capacity is shown in a graph according to data which are obtained experimentally.

In the drawing, a broken curve indicates a tendency in the conventional layered filter 8. A continuous curve indicates a tendency in the large capacity HEPA filter 10 according to the present embodiment. When the particle retaining amount in the conventional layered filter 8 and the particle retaining amount in the large capacity HEPA filter 10 are compared under condition that the compression loss which is caused by passing an air fluid through these filters reaches at a predetermined value which indicates a time for filter replacement. As a result, the particle retaining amount in the large capacity HEPA filter 10 according to the present embodiment is approximately three times as large as that of the conventional layered filter 8.

Generally, in a gas turbine, it is preferred that it is possible to operate a gas turbine continuously for one year (8,760 hours of operational time) without exchanging the filter. In the present embodiment, the large capacity EPA filter 10 has extremely high particle retaining capacity; continuous operation is possible without replacement. Therefore, it is 110,000 hours of continuous operation is possible. 110,000 hours is far longer than approximately 8,760 hours of one-year continuous operation which is required for a gas turbine.

Achievement of such a longer fatigue life in the filter can reduce the wasted filters; thus, the dust collecting device according to the present embodiment can be an ecology-friendly device.

The upstream non-woven fabric 12a is a layer which is disposed so as to face the upstream of the absorbed air flow in the layered filtering member 12. In the upstream non-woven fabric 12a, a fiber diameter is mainly 0.3 μm to 15 μm and thickness of the layer is 0.1 mm to 0.3 mm.

Also, the downstream non-woven fabric 12b is a layer which is disposed so as to face the downstream of the absorbed air flow in the layered filtering member 12. In the downstream non-woven fabric 12b, a fiber diameter is mainly 0.1 μm to 2 μm and thickness of the layer is 0.1 mm to 0.3 mm.

In addition, the upstream non-woven fabric 12a is formed by a filter medium such as a mixture of non-woven fabric in which a polyester fiber having relatively a large fiber diameter (first fiber) and a glass fiber (second fiber) having relatively a small fiber diameter. Simultaneously, the downstream non-woven fabric 12b is formed by a filter medium such as a mixture of non-woven fabric in which a polyester fiber having relatively a large fiber diameter (third fiber) and a glass fiber (fourth fiber) having relatively a small fiber diameter.

A polyester fiber having relatively a large fiber diameter can be entangled due to its flexibility; thus, it is possible to remove particles having middle to large particle diameter effectively. On the other hand, a glass fiber having a smaller fiber diameter than the fiber diameter of the polyester fiber can be mixed in an organization in which the polyester fiber is densely entangled; thus, it is possible to remove particles having finer particle diameter effectively.

Here, a formula such as "an upstream fiber ratio UR<a downstream fiber ratio" is effective under condition that the upstream fiber ratio UR (first fiber ratio) is defined as a quotient of the diameter of the glass fiber (second fiber) divided by the diameter of the polyester fiber (first fiber) and the downstream fiber ratio DR (second fiber ratio) is defined as a quotient of the diameter of the glass fiber (fourth fiber) divided by the diameter of the polyester fiber (third fiber).

As explained above, it is possible to remove 70 to 90% of 0.3 μm particle by the upstream non-woven fabric 12a reliably and 99.9% or more of 0.3 μm particle by the downstream non-woven fabric reliably.

By the way, as shown in FIG. 3, in the layered filter medium 12, a width of the minipleat shape is 10 mm to 30 mm a pitch dimension of the minipleat shape is 1.7 mm to 3.2 mm. By employing such dimension and shape, it is possible to realize an optimal dust collecting efficiency according to the filtering area. That is, in order to enlarge the filtering area in the layered filter medium 12, it is necessary to increase the width B in the minipleat and decrease the pitch dimension P2. However, if such an arrangement excesses, an air flow does not become uniform in an entire filter medium due to an increase of a flow resistance because of factors such as a contact of the neighboring V-shape wall sections of the filter medium and a shape thereof; thus, there is a concerning in that it is not possible to realize an optimum dust-collecting efficiency according to the filtering area. Therefore, by adopting a minipleat shape having a shape and dimension as described in the present invention, it is possible to realize a high dust-collecting efficiency according to the filtering area.

FIG. 6 is a graph showing a result which are obtained experimentally. Here, under condition that the width B of the minipleat is kept at 30 mm and the pitch dimension P2 is gradually narrowed, there is a tendency in that the compression loss decreases until it reaches to the point where the compression loss becomes lowest which can be represented by 2.5 to 3.0 mm of pitch dimension alternatively. This is caused by the increase in the filtering area. However, as shown in the drawing, if the pitch dimension P2 is narrowed further so as to increase the filtering area, the neighboring filter media contact each other; therefore, the compression loss increases. From this point of view, it is preferable that the pitch dimension P2 is in a range of 1.7 to 3.2 mm so as to obtain a tolerable compression loss.

Effects which are realized in the dust collecting device, the large capacity HEPA filter 10, and the air intake device according to the present invention for a gas turbine are summarized as follows.

In the dust collecting device according to the present embodiment, the large capacity HEPA filter 10 has a layered filter medium 12 which is formed by the upstream non-woven fabric 12a and the downstream non-woven fabric 12b which are unitarily formed to be a piece of fabric such that the shape of the layer in its thickness direction is a minipleat shape, and the entire cross section in its thickness direction is formed in a plurality of continuous V-shapes. According to such a structure, two pieces of filter media are formed into a piece of layered filter medium 12 in a minipleat shape; therefore, it is possible to make the device in a small size. In addition, the layered filter medium 12 is formed in a minipleat shape; thus, it is possible to increase the filtering area comparing to a case of a simple flat shape. Therefore, it is possible to increase the dust collecting capacity so as to realize a longer product life. Therefore, it is possible to maintain a high dust collecting efficiency form a longer hours by such a small device.

Also, in the large capacity HEPA filter 10 according to the present embodiment, the layered filter medium 12 is contained in the filter frame 11 having size such as 600±20 mm in height, 600±20 mm in width, and 300±20 mm in length and 5 to 7 Vs are formed. By doing this, it is possible to realize a filtering area as large as 30 m$^2$ to 60 m$^2$ even though the layered filter medium 12 is contained in the small filter frame 11.

Also, in the large capacity HEPA filter 10 according to the present embodiment, the upstream non-woven fabric 12a having 0.1 to 0.3 mm of thickness is formed by a filter medium having 0.3 μm to 15 μm of fiber diameter. Also, the downstream non-woven fabric 12b having 0.1 mm to 0.3 mm thickness is formed by a filter medium having 0.1 μm to 2 μm of fiber diameter. By doing this, in the upstream non-woven fabric 12a, it is possible to remove 70 to 90% of 0.3 μm particle reliably. Also, in the downstream non-woven fabric 12b, it is possible to remove 99.9% or more of 0.3 μm particle reliably.

In the large capacity HEPA filter 10 according to the present embodiment, width B in the minipleat shape in the layered filter medium 12 is 10 to 30 mm, and the pitch dimension P2 is 1.7 to 3.2 mm. By doing this, it is possible to realize a high dust collecting efficiency according to the filtering area.

Also, in the large capacity HEPA filter 10 according to the present embodiment, the upstream non-woven fabric 12a and the downstream non-woven fabric 12b in the layered filter medium 12 is formed by a non-woven fabric in which a polyester fiber and a glass fiber are entangled. By doing this, it is possible to remove particles having a small particle diameter and particles having a large particle diameter effectively.

Furthermore, in the present embodiment, a dust collecting device which is provided with a large capacity HEPA filter 10 is disposed at an air intake mouth in a gas turbine. By doing this, the large capacity HEPA filter 10 can be installed in a narrow space because the large capacity HEPA filter 10 is a small filter. Also, it is possible to operate a gas turbine for a longer hours without replacing the large capacity HEPA filter 10 because the large capacity HEPA filter 10 can maintain a high dust collecting efficiency for a longer hours.

Consequently, a second embodiment according to the present invention is explained with reference to FIG. 7. Explanation is made mainly with respect to differences between the first embodiment and the second embodiment. The features which is the same as that in the first embodiment is not explained.

Figure 7A:
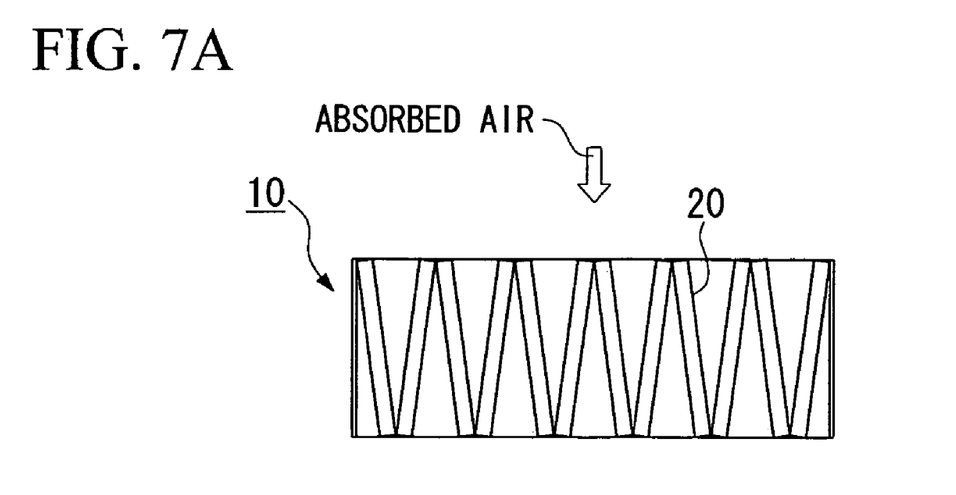
FIG. 7A is a plan view of a cross section.
Figure 7B:
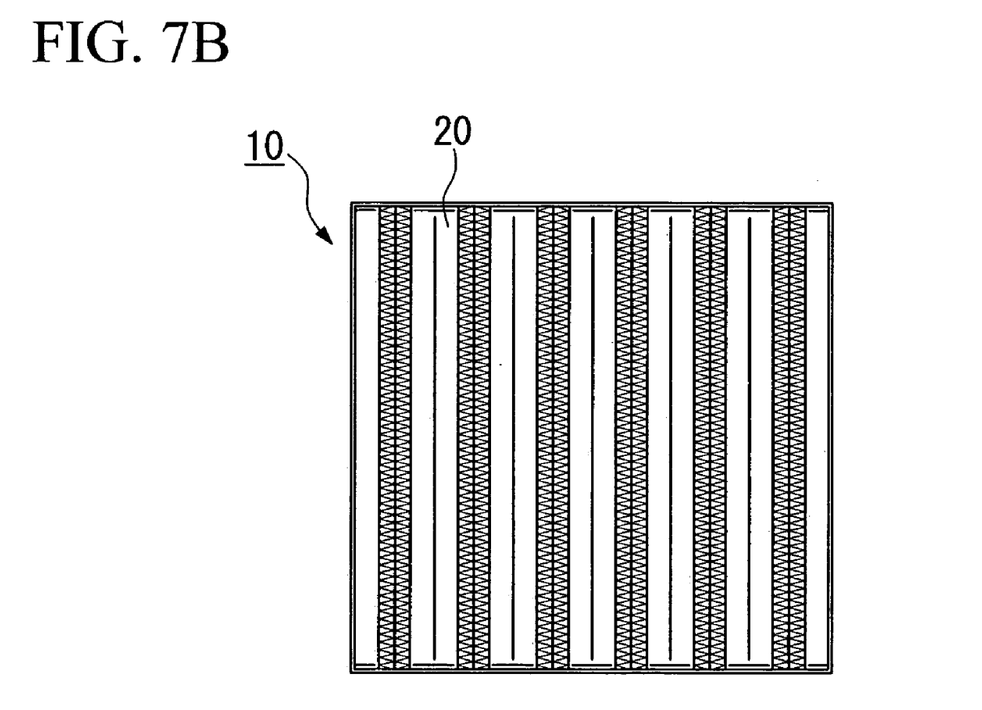
FIG. 7B is a back view which is observed from a downstream.

Here, FIGS. 7A to 7C show a second embodiment of a large capacity HEPA filter which is used in a dust collecting device according to the present invention. FIG. 7A is a plan view of a cross section. FIG. 7B is a back view which is observed from a downstream.

In the dust collecting device according to the present embodiment, a direction in which a minipleat shape in the layered filter medium 20 (here, reference numeral 20 is add so as to explain independently from the layered filter medium 12) in the large capacity HEPA filter 10 is a feature. That is, in the above first embodiment, a minipleat shape is formed in a direction (direction in which triangular waves occurs in a flowing direction of the absorbed air flow) in which a triangular waves are observed viewed in a plan cross section. In contrast, in the present embodiment, a minipleat shape is formed in a direction (perpendicular direction) in which a triangular waves are observed viewed in a cross section in an orthogonal direction to an absorbed air flow.

According to the large capacity HEPA filter 10 which is explained as above according to the present embodiment, it is possible to realize the same effect as the effect which is realized in the above first embodiment.

Consequently, a third embodiment according to the present invention is explained with reference to FIG. 8. Explanation is made mainly with respect to differences between the first embodiment and the second embodiment. The features which is the same as that in the first embodiment is not explained.

Figure 8:
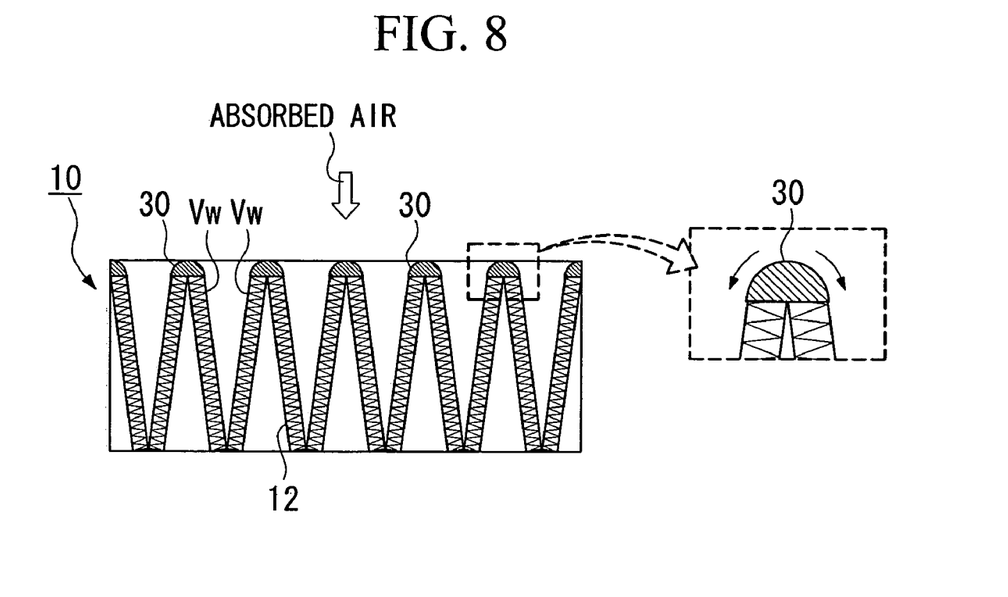
FIG. 8 is a plan view of a cross section for a third embodiment of a dust collecting filter which is used in a dust collecting device according to the present invention viewed in the same way as FIG. 2A.

Here, FIG. 8 shows a large capacity HEPA filter which is used in the dust collecting device according to the present embodiment. FIG. 8 is described in the same manner as the manner in which FIG. 2A is described.

In the dust collecting device according to the present embodiment, a feature is that a flow rectifying section 30 is formed for introducing the absorbed air which reaches to an upstream angular section to a space which is formed between the wall sections Vw, Vw neighboring each other in a V-shape in the upstream angular section having V-shape formed by the layered filter medium 12 in the large capacity HEPA filter 10.

The shape of the flow rectifying section 30 is formed in a convex half-round toward the upstream in the absorbed air flow viewed in opposite direction to the V-shape formed by the layered filter medium 12 (viewed from an eyepoint in FIG. 8). In addition, by these flow rectifying sections 30, it is possible to reduce the compression loss in an air intake mouth in the large capacity HEPA filter 10 as much as possible. That is, if V-shape increases so as to enlarge the filtering area, an area for passing the air flow in an air intake mouth decreaes. Occasionally, the air flow separates in the upstream angular section and there occurs a contraction air flow; thus, the compression loss increases. In such a case, it is possible to reduce the compression loss in the air intake mouth by disposing a flow rectifying section 30 in the upstream angular section where the air flow separates easily so as to introduce the air flow smoothly.

Here, in the present embodiment, the flow rectifying section 30 is formed in a half round. Any other shape such as a mountain shape having acute top toward the upstream or the like are acceptable as long as the absorbed air flow which reaches the upstream angular section can be introduced thereinside smoothly.

Consequently, a fourth embodiment according to the present invention is explained with reference to FIG. 9. Explanation is made mainly with respect to differences between the first embodiment and the second embodiment. The features which is the same as that in the first embodiment is not explained.

Figure 9:
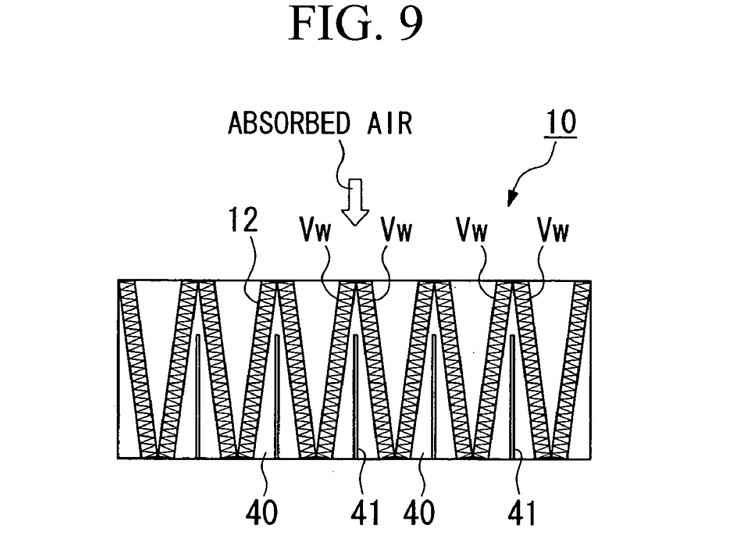
FIG. 9 is a plan view of a cross section for a fourth embodiment of a dust collecting filter which is used in a dust collecting device according to the present invention viewed in the same way as FIG. 2A.

Here, FIG. 9 shows a large capacity HEPA filter which is used in the dust collecting device according to the present embodiment. FIG. 9 is described in the same manner as the manner in which FIG. 2A is described.

In the dust collecting device according to the present embodiment, a feature is that a separating member 41 for separating the absorbed air flow after passing the space between the wall sections Vw, Vw neighboring each other in a V-shape is formed in a downstream space 40 formed by the layered filter medium 12 in a V-shape in the large capacity HEPA filter 10.

The separating member 41 is formed by a plurality (five pieces in an example shown in the drawing) of flat boards which are disposed in parallel in an air flow direction and in parallel with each other. The separating member 41 is a bulkhead such that the absorbed air after passing the filter medium wall sections should not interfere with each other.

For example, in a case in which a separating member 41 is not provided, the air flows immediately after passing the neighboring wall sections Vw, Vw in the layered filter medium 12 interfere with each other; thus, the compression loss increases. In such a case, it is possible to prevent such an interference and restrict that the compression loss increase by disposing the separating members 41 between the neighboring wall sections Vw, Vw so as to separate the space there. Therefore, it is possible to restrict the increase of the compression loss during passing the air flow through the large capacity HEPA filter 10.

In the above explanations for the embodiments 1 to 4, explanation was made for a case in which the dust collecting device which is provided with the large capacity HEPA filter 10 according to the present invention is disposed in the air intake mouth in a gas turbine. However, disposition of the dust collecting device according to the present invention is not limited in such a structure. More importantly, the dust collecting device according to the present invention can be disposed any other positions such as in a wind generating device or in an air intake mouth for an air conditioner.

introducing the absorbed air which reaches to an upstream angular section to a space which is formed between the wall sections Vw, Vw neighboring each other in a V-shape in the upstream angular section having V-shape formed by the layered filter medium 12 in the large capacity HEPA filter 10.

The shape of the flow rectifying section 30 is formed in a convex half-round toward the upstream in the absorbed air flow viewed in opposite direction to the V-shape formed by the layered filter medium 12 (viewed from an eyepoint in FIG. 8). In addition, by these flow rectifying sections 30, it is possible to reduce the compression loss in an air intake mouth in the large capacity HEPA filter 10 as much as possible. That is, if V-shape increases so as to enlarge the filtering area, an area for passing the air flow in an air intake mouth decreaes. Occasionally, the air flow separates in the upstream angular section and there occurs a contraction air flow; thus, the compression loss increases. In such a case, it is possible to reduce the compression loss in the air intake mouth by disposing a flow rectifying section 30 in the upstream angular section where the air flow separates easily so as to introduce the air flow smoothly.

The invention claimed is:
1. A dust collecting filter, comprising:
  a layered filter medium unitarily formed by an upstream non-woven fabric configured to remove 70 to 90% of 0.3 μm particles and a downstream non-woven fabric configured to remove 99.9% of 0.3 μm particles or more, wherein a shape of the layered filter medium is a minipleat shape in a thickness direction, an entire shape of the layered filter medium in the thickness direction is a plurality of continuous V shapes, the upstream non-woven fabric is a filter medium having a thickness from 0.1 mm to 0.3 mm formed by fibers having a diameter from 0.3 μm to 15 μm, and the downstream non-woven fabric is a filter medium having a thickness from 0.1 mm to 0.3 mm formed by fibers having a diameter from 0.1 μm to 2 μm.

2. The dust collecting filter according to claim 1, wherein the layered filter medium is contained in a filter frame having 600±20 mm in height, 600±20 mm in width, and 300±20 mm in length in size, and 5 to 7 V shapes are formed.

3. The dust collecting filter according to claim 1, wherein a width of the minipleat shape is from 10 mm to 30 mm, and a pitch dimension of the minipleat shape is from 1.7 mm to 3.2 mm.

4. The dust collecting filter according to claim 1, wherein the upstream non-woven fabric and the downstream non-woven fabric are non-woven fabrics formed by mixing a polyester fiber and a glass fiber.

5. The dust collecting filter according to claim 1, wherein a flow rectifying section for introducing an air flow into a space formed between V-shaped wall sections comprises in an upstream V-shaped angular section formed by the layered filter medium.

6. The dust collecting filter according to claim 1, wherein a separating member configured to separate an air flow which passes through a space between V-shaped wall sections is disposed in a downstream space which has a V-shape formed by the layered filter medium.

7. A dust collecting device comprising:
a dust collecting filter according to claim 1.

8. The dust collecting device according to claim 7, wherein the dust collecting device is disposed in an air intake mouth of a gas turbine so as to remove lithometeors contained in the air absorbed by the air intake mouth.

9. A dust collecting device for a gas turbine comprising the dust collecting device according to claim 7.

10. A dust collecting filter comprising a layered filter medium, wherein the layered filter medium comprises a first non-woven fabric having relatively low particle removing efficiency and a second non-woven fabric having relatively high particle removing efficiency unitarily, the first non-woven fabric is a filter medium having a thickness from 0.1 mm to 0.3 mm formed by fibers having a diameter from 0.3 μm to 1.5 μm, and the second non-woven fabric is a filter medium having a thickness from 0.1 mm to 0.3 mm formed by fibers having a diameter from 0.1 μm to 2 μm.

11. The dust collecting filter according to claim 10, wherein the first non-woven fabric is formed by mixing a first fiber having a relatively larger fiber diameter and a second fiber having a relatively smaller fiber diameter, the second non-woven fabric is formed by mixing a third fiber having a relatively larger fiber diameter and a fourth fiber having a relatively smaller fiber diameter, and a first fiber ratio is smaller than a second fiber ratio, the first fiber ratio being defined as a quotient of the diameter of the second fiber divided by the diameter of the first fiber and the second fiber ratio being defined as a quotient of the diameter of the fourth fiber divided by the diameter of the third fiber.

12. The dust collecting filter according to claim 11, wherein the first fiber and the third fiber are polyester fibers, and the second fiber and the fourth fiber are glass fibers.

13. The dust collecting filter according to claim 10, wherein the first non-woven fabric is configured to remove 70 to 90% of 0.3 μm particle, and the second non-woven fabric is configured to remove 99.9% of 0.3 μm particle or more.

14. The dust collecting filter according to claim 10, further comprising:
a two-layer structure of the first non-woven fabric and the second non-woven fabric.

15. The dust collecting filter according to claim 10, wherein a layered filter medium has a minipleat shape in a thickness direction.

16. The dust collecting filter according to claim 15, wherein a width of the minipleat shape is from 10 mm to 30 mm, and a pitch dimension of the minipleat shape is from 1.7 mm to 3.2 mm.

17. The dust collecting filter according to claim 15, wherein an entire shape of the layered filter medium in the thickness direction is a plurality of continuous V shapes.

18. The dust collecting filter according to claim 17, wherein a flow rectifying section for introducing an air flow into a space formed between V-shaped wall sections comprises in an upstream V-shaped angular section formed by the layered filter medium.

19. The dust collecting filter according to claim 17, wherein a separating member configured to separate an air flow which passes through a space between V-shaped wall sections is disposed in a downstream space which has a V-shape formed by the layered filter medium.

20. The dust collecting filter according to claim 17, wherein the layered filter medium is contained in a filter frame having a dimensional ratio of height, width, and length of 2:2:1.

21. The dust collecting filter according to claim 20, wherein 5 to 7 V-shapes wall sections are formed in the layered filter medium.

* * * * *